(12) United States Patent
Hua et al.

(10) Patent No.: US 10,739,495 B2
(45) Date of Patent: Aug. 11, 2020

(54) CLOUD WATER RESOURCE DETECTING SYSTEM AND METHOD

(71) Applicants: Xi'an University of Technology, Shaanxi (CN); Lanzhou University, Lanzhou, Gansu (CN)

(72) Inventors: Dengxin Hua, Shaanxi (CN); Lei Zhang, Gansu (CN); Fei Gao, Shaanxi (CN); Jun Wang, Shaanxi (CN); Huige Di, Shaanxi (CN); Zhongwei Huang, Gansu (CN); Tingyao He, Shaanxi (CN); Qing Yan, Shaanxi (CN); Wenhui Xin, Shaanxi (CN); Xianjie Cao, Gansu (CN); Yufeng Wang, Shaanxi (CN); Li Wang, Shaanxi (CN); Tian Zhou, Gansu (CN); Yan Li, Shaanxi (CN)

(73) Assignees: Xi'an University of Technology, Shaanxi (CN); Lanzhou University, Lanzhou (CN)

( * ) Notice: Subject to any disclaimer, the term of this patent is extended or adjusted under 35 U.S.C. 154(b) by 0 days.

(21) Appl. No.: 16/480,870

(22) PCT Filed: Oct. 19, 2018

(86) PCT No.: PCT/CN2018/111097
§ 371 (c)(1),
(2) Date: Jul. 25, 2019

(87) PCT Pub. No.: WO2019/214166
PCT Pub. Date: Nov. 14, 2019

(65) Prior Publication Data
US 2020/0064514 A1    Feb. 27, 2020

(30) Foreign Application Priority Data

May 11, 2018 (CN) .......................... 2018 1 0451063

(51) Int. Cl.
*G01W 1/06* (2006.01)
*G01S 13/95* (2006.01)
(Continued)

(52) U.S. Cl.
CPC ............... *G01W 1/06* (2013.01); *G01S 13/95* (2013.01); *G01S 17/95* (2013.01); *G01W 1/14* (2013.01); *A01G 15/00* (2013.01)

(58) Field of Classification Search
CPC ........... G01W 1/06; G01W 1/14; G01S 13/95; G01S 17/95; G01S 13/951; G01S 13/86; G01S 13/865
See application file for complete search history.

(56) References Cited

U.S. PATENT DOCUMENTS

2019/0339416 A1* 11/2019 Elkabetz .............. G08G 5/0065

FOREIGN PATENT DOCUMENTS

| CN | 1987520 | 6/2007 |
|---|---|---|
| CN | 101833089 | 9/2010 |

(Continued)

OTHER PUBLICATIONS

Cloud water resources and precipitation efficiency evaluation over China (Cai Miao) China Doctoral Dissertations Full-text Database, Dec. 31, 2013 1-15, entire document.

(Continued)

*Primary Examiner* — Bryan Bui (57) ABSTRACT

A cloud water resource detecting system and method, the system includes computing device, and Raman lidar, microwave radiometer, millimeter wave cloud radar, wind profile radar and Doppler wind lidar in communication connection with the computing device. The Raman lidar and the microwave radiometer are configured to obtain temperature and humidity data of a cloud system. The millimeter wave cloud radar and the microwave radiometer are configured to obtain (Continued)

cloud water content profiles. The wind profile radar is configured to obtain a horizontal wind speed of the cloud system. The Doppler wind lidar is configured to obtain the vertical motion speed of a cloud bottom. The computing device is configured to calculate the total amount of cloud water according to the temperature and humidity data of the cloud system, the cloud water content profiles, the horizontal wind speed of the cloud system and the vertical motion speed of the cloud bottom.

14 Claims, 4 Drawing Sheets

(51) Int. Cl.
    *G01S 17/95*     (2006.01)
    *G01W 1/14*     (2006.01)
    *A01G 15/00*     (2006.01)

(56) References Cited

FOREIGN PATENT DOCUMENTS

| | | |
|---|---|---|
| CN | 101881842 | 11/2010 |
| CN | 202837189 | 3/2013 |
| CN | 103605136 | 2/2014 |
| CN | 104007486 | 8/2014 |
| CN | 105445816 | 3/2016 |
| CN | 106526709 | 3/2017 |
| CN | 108614309 | 10/2018 |

OTHER PUBLICATIONS

International Search Report and Written Opinion for PCT/CN2018/11190, dated Feb. 15, 2019. English translation.

\* cited by examiner

CLOUD WATER RESOURCE DETECTING SYSTEM AND METHOD

CROSS-REFERENCE TO RELATED APPLICATION

The present disclosure is a United States national phase of International Application No. PCT/CN2018/111097 filed with the Chinese Patent office on Oct. 19, 2018, which claims the priority to a Chinese patent application No. 2018104510637, filed with the Chinese Patent Office on May 11, 2018 and entitled "Cloud Water Resource Detecting System and Method", the content of which is incorporated herein by reference in its entirety.

TECHNICAL FIELD

The present disclosure relates to the field of detecting technologies, and in particular to a cloud water resource detecting system and method.

BACKGROUND ART

Fresh water resource is essential for the survival of humans. Fresh water resource scarcity in many arid and semi-arid regions across the world severely affects the survival of humans who live there. Since fresh water is from precipitation in principle, many attempts have been made to increase the amount of precipitation in a certain area at a certain period of time by an artificial rain enhancement.

The study on atmospheric physics shows that there is a limited maximum possible amount of precipitation provided by natural processes in a certain area at a certain period of time under certain weather conditions, where such amount is referred to as the amount of cloud water resource. However, in fact, in the variable atmospheric environment, these cloud water resources fail to completely fall to the ground to form precipitation. The proportion of an actual amount of precipitation to the amount of cloud water resource is referred to as a precipitation efficiency, which is mainly determined by the microphysical structure in the cloud. The artificial rain enhancement operation is to increase the amount of precipitation in this area at this period of time by changing the microphysical structure of the cloud through manual intervention. The amount of cloud water resource is the limit value of the amount of precipitation that can be reached after precipitation is increased in this way. Therefore, it is necessary to provide a measure to detect the amount of cloud water resource.

SUMMARY

In order to at least partially overcome the above-described deficiencies in the prior art, it is an object of the present disclosure to provide a cloud water resource detecting system and method.

The present disclosure provides a cloud water resource detecting system, comprising a Raman lidar, a microwave radiometer, a millimeter wave cloud radar, a wind profile radar, a Doppler wind lidar, and a computing device, wherein the Raman lidar and the microwave radiometer are configured to obtain temperature and humidity data of a cloud system;

the millimeter wave cloud radar and the microwave radiometer are configured to obtain cloud water content profiles;

the wind profile radar is configured to obtain a horizontal wind speed of a cloud system;

the Doppler wind lidar is configured to obtain a vertical motion speed of a cloud bottom; and the computing device is in communication connection with the Raman lidar, the microwave radiometer, the millimeter wave cloud radar, the wind profile radar, and the Doppler wind lidar, and is configured to calculate a total amount of cloud water according to the temperature and humidity data of the cloud system, the cloud water content profiles, the horizontal wind speed of the cloud system and the vertical motion speed of the cloud bottom, implementing the detection of the cloud water resource.

Optionally, in the present disclosure, the Raman lidar is configured to detect temperature and humidity profiles; and the microwave radiometer is in communication connection with the Raman lidar and is configured to obtain the temperature and humidity data of the cloud system by performing inversion according to the temperature and humidity profiles.

Optionally, in the present disclosure, the microwave radiometer is further in communication connection with the millimeter wave cloud radar, and is configured to obtain, after obtaining an initial cloud water content profile data, the cloud water content profiles according to the initial cloud water content profile data and the temperature and humidity profiles.

Optionally, in the present disclosure, a propagating direction of a beam emitted by the Doppler wind lidar is perpendicular to the ground.

Optionally, in the present disclosure, the computing device comprises:

a component determining module, configured to determine an amount of original cloud water according to the cloud water content profiles, determine an amount of input cloud water in a horizontal direction according to the horizontal wind speed of the cloud system and the cloud water content profiles, and calculate an amount of condensed cloud water in a vertical direction according to the temperature data and the vertical motion speed of the cloud bottom; and a total amount calculating module, configured to obtain the total amount of cloud water by summing the amount of original cloud water, the amount of input cloud water, and the amount of condensed cloud water.

Optionally, in the present disclosure, the temperature and humidity data of the cloud system comprises the temperature data of the cloud bottom and the humidity data of the cloud bottom, and the component determining module is specifically configured to:

determine an amount of saturated water vapor corresponding to the temperature data of the cloud bottom, determine a density of saturated water vapor according to the amount of saturated water vapor and the humidity data of the cloud bottom, determine a water vapor condensation rate according to the density of saturated water vapor and the vertical motion speed, and integrate the water vapor condensation rate over time to obtain the amount of condensed cloud water.

Optionally, in the present disclosure, the temperature and humidity data of the cloud system further comprises temperature data of a cloud top, and the component determining module is further specifically configured to:

determine a density of saturated water vapor corresponding to the temperature data of the cloud top, and correct the amount of condensed cloud water according to the density of saturated water vapor.

The present disclosure also provides a cloud water resource detecting method, which is applied to a cloud water resource detecting system comprising a Raman lidar, a microwave radiometer, a millimeter wave cloud radar, a wind profile radar, a Doppler wind lidar, and a computing device, wherein the computing device is in communication connection with the Raman lidar, the microwave radiometer, the millimeter wave cloud radar, the wind profile radar and the Doppler wind lidar, the method comprising:

the Raman lidar and the microwave radiometer detecting collectively temperature and humidity data of a cloud system;

the millimeter wave cloud radar and the microwave radiometer detecting collectively cloud water content profiles;

the wind profile radar detecting a horizontal wind speed of a cloud system;

the Doppler wind lidar detecting a vertical motion speed of a cloud bottom; and the computing device calculating a total amount of cloud water according to the temperature and humidity data of the cloud system, the cloud water content profiles, the horizontal wind speed of the cloud system and the vertical motion speed of the cloud bottom, implementing a detection of cloud water resource.

Optionally, in the present disclosure, the microwave radiometer is in communication connection with the Raman lidar, and the Raman lidar and the microwave radiometer detect collectively temperature and humidity data of a cloud system, comprising:

the Raman lidar detecting temperature and humidity profiles; and the microwave radiometer obtaining the temperature and humidity data of the cloud system by performing inversion according to the temperature and humidity profiles.

Optionally, in the present disclosure, the computing device calculates a total amount of cloud water according to the temperature and humidity data of the cloud system, the cloud water content profiles, the horizontal wind speed of the cloud system and the vertical motion speed of the cloud bottom, implementing a detection of cloud water resource, comprising:

the computing device obtaining an amount of original cloud water according to the cloud water content profiles;

the computing device calculating an amount of input cloud water according to the amount of original cloud water and the horizontal wind speed of the cloud system;

the computing device calculating an amount of condensed cloud water according to the temperature and humidity data of the cloud system and the vertical motion speed of the cloud bottom; and the computing device calculating the total amount of cloud water according to the amount of original cloud water, the amount of input cloud water, and the amount of condensed cloud water.

Optionally, in the present disclosure, the temperature and humidity data of the cloud system comprises temperature data of a cloud bottom and humidity data of a cloud bottom; the computing device calculates an amount of condensed cloud water according to the temperature and humidity data of the cloud system, and the vertical motion speed of the cloud bottom, comprising:

determining an amount of saturated water vapor corresponding to the temperature data of the cloud bottom, determining a density of saturated water vapor according to the amount of saturated water vapor and the humidity data of the cloud bottom, and determining a water vapor condensation rate according to the density of saturated water vapor and the vertical motion speed; and integrating the water vapor condensation rate over time to obtain the amount of condensed cloud water.

Optionally, in the present disclosure, the computing device calculates an amount of condensed cloud water according to the temperature and humidity data of the cloud system and the vertical motion speed of the cloud bottom, comprising:

the computing device calculating a water vapor condensation rate according to the temperature and humidity data of the cloud system and the vertical motion speed of the cloud bottom; and the computing device performing integration according to the water vapor condensation rate to obtain the amount of condensed cloud water.

Optionally, in the present disclosure, the temperature and humidity data of the cloud system further comprises temperature data of the cloud top; and the computing device calculates an amount of condensed cloud water according to the temperature and humidity data of the cloud system, and the vertical motion speed of the cloud bottom, further comprising:

determining a density of saturated water vapor corresponding to the temperature data of the cloud top, and correcting the obtained amount of condensed cloud water according to the density of saturated water vapor.

Optionally, in the present disclosure, the computing device calculates the total amount of cloud water according to the amount of original cloud water, the amount of input cloud water, and the amount of condensed cloud water, comprising:

the computing device calculating the total amount of cloud water by a preset formula for a total amount of cloud water and the amount of original cloud water, the amount of input cloud water and the amount of condensed cloud water;

wherein the preset formula for a total amount of cloud water is:

$$PP = Q_h(0) + \left| \int_0^T F_h^{in} dt \right| + \int_0^T P_{cong} dt$$

wherein PP is representative of a total amount of cloud water, $Q_h(0)$ is representative of an amount of original could water, $F_h^{in}$ is representative of an amount of horizontally input cloud water per unit time, $P_{cong}$ is representative of a water vapor condensation rate and T is representative of a period of time for detecting.

The present disclosure also provides a cloud water resource detecting method, which is applied to a computing device, wherein the computing device is in communication connection with a Raman lidar, a microwave radiometer, a millimeter wave cloud radar, a wind profile radar, and a Doppler wind lidar, the method comprising:

receiving temperature and humidity data of a cloud system detected collectively and sent by the Raman lidar and the microwave radiometer;

receiving cloud water content profiles detected collectively and sent by the millimeter wave cloud radar and the microwave radiometer;

receiving a horizontal wind speed of a cloud system sent by the wind profile radar;

receiving a vertical motion speed of a cloud bottom sent by the Doppler wind lidar; and calculating a total amount of cloud water according to the received temperature and humidity data of the cloud system, cloud water content profiles, horizontal wind speed of the cloud system and vertical motion speed of the cloud bottom, implementing a detection of cloud water resource.

To understand the above objects, features and advantages of the present disclosure more easily, embodiments of the present disclosure will be illustrated hereinafter in conjunction with the attached drawings in detail.

BRIEF DESCRIPTION OF THE DRAWINGS

To illustrate the technical solution of the present disclosure more clearly, drawings required for use in the embodiments will be introduced briefly below. It should be understood that the following drawings show only some embodiments of the present disclosure and therefore should not be considered as a limitation to the scope, and those ordinarily skilled in the art may obtain other related drawings in the light of these drawings without any inventive labor.

Reference signs: 10—cloud water resource detecting system; 100—Raman lidar; 200—microwave radiometer; 300—millimeter wave cloud radar; 400—wind profile radar; 500—Doppler wind lidar; 600—computing device.

DETAILED DESCRIPTION OF THE EMBODIMENTS

The technical solutions of the present disclosure will be described below clearly and completely with reference to the drawings of the present disclosure. It is apparent that the embodiments described are merely some, but not all of the embodiments of the present disclosure. Generally, the components of the present disclosure, which are described and illustrated in the drawings herein, may be arranged and designed in a variety of different configurations. Therefore, the following detailed description of the embodiments of the present disclosure provided in the drawings is not intended to limit the claimed scope of the present disclosure, but illustrate only selected embodiments of the present disclosure. All the other embodiments, obtained by those skilled in the art in light of the embodiments of the present disclosure without inventive efforts, will fall within the claimed scope of the present disclosure.

It should be noted that similar reference numerals and letters indicate similar items in the following drawings, and therefore, once a certain item is defined in one drawing, it is not necessary to further define or explain it in the subsequent drawings. Meanwhile, in the description of the present disclosure, terms such as "first" and "second" are used only for distinguishing the description, and should not be understood as indicating or implying relative importance.

Figure 1:
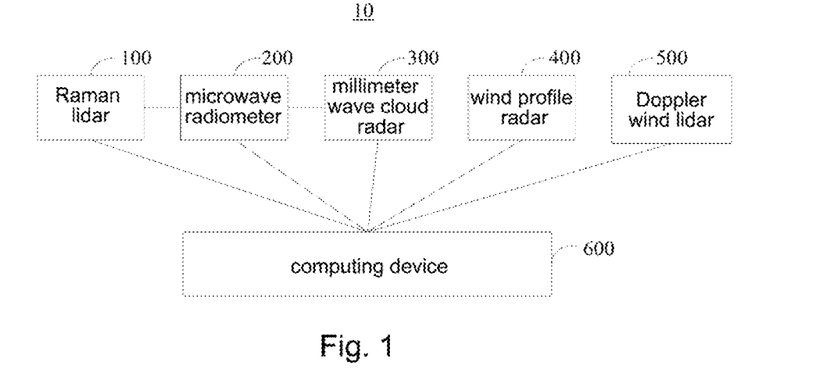
FIG. 1 is a schematic frame diagram of a cloud water resource detecting system provided by the present disclosure.

Referring to FIG. 1, FIG. 1 is a schematic frame diagram of a cloud water resource detecting system 10 provided by the present disclosure. The cloud water resource detecting system 10 comprises a Raman lidar 100, a microwave radiometer 200, a millimeter wave cloud radar 300, a wind profile radar 400, a Doppler wind lidar 500, and a computing device 600. The cloud water resource detecting system 10 may implement the measurement of atmospheric profiles, such as temperature, humidity and horizontal wind speed of a cloud system, cloud water content profiles, and height, temperature, and vertical motion speed of a cloud bottom, and obtain a total amount of cloud water in a detected area by performing a fusion analysis on multisource observation data, thereby providing data resource for artificially influencing the weather, and providing an effective tool for studying the precipitation potential of the cloud system.

In the present embodiment, the Raman lidar 100 and the microwave radiometer 200 are configured to obtain temperature and humidity data of a cloud system. The millimeter wave cloud radar 300 and the microwave radiometer 200 are configured to obtain cloud water content profiles. The wind profile radar 400 is configured to obtain a horizontal wind speed of a cloud system. The Doppler wind lidar 500 is configured to obtain a vertical motion speed of a cloud bottom. The computing device 600 is in communication connection with the Raman lidar 100, the microwave radiometer 200, the millimeter wave cloud radar 300, the wind profile radar 400, and the Doppler wind lidar 500, and is configured to calculate a total amount of cloud water according to the temperature and humidity data of the cloud system, the cloud water content profiles, the horizontal wind speed of the cloud system and the vertical motion speed of the cloud bottom, implementing a detection of cloud water resource.

Wherein the data communication between the computing device 600 and the Raman lidar 100, the microwave radiometer 200, the millimeter wave cloud radar 300, the wind profile radar 400 and the Doppler wind lidar 500 may be implemented in a wire or wireless manner. The profile is a curve or function that describes a vertical distribution of a wind direction, a wind speed, a temperature, a humidity, and other meteorological elements or pollutant concentrations.

In the present embodiment, the Raman lidar 100 is configured to detect temperature and humidity profiles. The microwave radiometer 200 is in communication connection with the Raman lidar 100 and is configured to obtain the temperature and humidity data of the cloud system by performing inversion according to the temperature and humidity profiles. Therefore, by comprehensively utilizing the detecting advantages of the Raman lidar 100 and the microwave radiometer 200, and taking the high-resolution temperature and humidity profile data observed by the Raman lidar 100 in a clear sky region as an initial value for the microwave radiometer 200 for performing inversion, satisfactory temperature and humidity data (i.e., the temperature and humidity data of the cloud system) required for use in cloud water resource study can be obtained by performing physical inversion.

In the present embodiment, the microwave radiometer 200 is further in communication connection with the millimeter wave cloud radar 300, and is configured to obtain, after obtaining initial cloud water content profile data, the cloud water content profiles according to the initial cloud water content profile data and the temperature and humidity profiles. Measurement of cloud water content profiles can be implemented by combining data jointly observed by the microwave radiometer 200 and the millimeter wave cloud radar 300 (i.e., the initial cloud water content profile data) with the temperature and humidity profile (or the temperature and humidity data of the cloud system) obtained by the Raman lidar 100 with respect to each height level.

In the present embodiment, the wind profile radar 400 is a remote sensing device that performs upper air wind field detection by emitting electromagnetic wave beams in different directions toward upper air, and receiving and processing information returned by these electromagnetic wave beams due to non-uniform vertical structure of the atmosphere. The wind profile radar 400 can detect the change of a wind direction and a wind speed and other meteorological elements above it with respect to height by the Doppler effect, and has the advantages of high resolution of time and space and high degree of automation, etc. in case of detecting. A horizontal wind speed of a cloud system can be obtained by the wind profile radar 400.

In the implementation of the present embodiment, a propagating direction of a beam emitted by the Doppler wind lidar 500 is perpendicular to the ground, that is, the direction of the beam is perpendicular to the ground, so as to measure the vertical motion speed of the cloud bottom better, and it should be understood that the vertical motion speed here refers to a vertical motion speed of airflow at the cloud bottom.

In the implementation of the present embodiment, the computing device 600 may be any device with data processing and communicating functions, for example, may be a personal computer (PC), a server, etc., so as to gather and analyze the above obtained data, and so on, thereby enabling a detection of a total amount of cloud water in the detected area, and providing relevant information for studying the distribution and change of the cloud water resource, and identifying the interaction mechanism between the cloud and the aerosol, and as on. In the above, when the computing device 600 is a server, the server may be either a stand-alone server or a server cluster composed of multiple servers.

In detail, the computing device 600 may comprise a processor and a machine readable storage medium, and the processor and the machine readable storage medium are electrically connected directly or indirectly to each other to implement transmission or interaction of data. For example, these elements may be electrically connected with one another via one or more communication buses or signal lines. The machine readable storage medium is stored with machine executable instructions, by reading and executing the machine executable instructions corresponding to logic of detecting the cloud water resource, the processor can execute the cloud water resource detecting method described below.

The machine readable storage medium mentioned herein may be any electronic, magnetic, optical, or other physical storage apparatus, and may contain storage information such as executable instructions, data and the like.

Optionally, in the present disclosure, the computing device 600 may comprise a component determining module and a total amount calculating module, and the component determining module and the total amount calculating module may each be an executable module stored in the machine readable storage medium, and are called and executed by the processor.

The component determining module is configured to determine an amount of original cloud water according to the cloud water content profiles, determine an amount of input cloud water in a horizontal direction according to the horizontal wind speed of the cloud system and the cloud water content profiles, and calculate an amount of condensed cloud water in a vertical direction according to the temperature and humidity data of the cloud system and the vertical motion speed.

Optionally, the temperature and humidity data of the cloud system may comprise temperature data of a cloud bottom and humidity data of a cloud bottom, and in this case, the component determining module may be specifically configured to determine an amount of saturated water vapor corresponding to the temperature data of the cloud bottom, determine a density of saturated water vapor according to the amount of saturated water vapor and the humidity data of the cloud bottom, determine a water vapor condensation rate according to the density of saturated water vapor and the vertical motion speed, and integrate the water vapor condensation rate over time to obtain the amount of condensed cloud water.

Optionally, the temperature and humidity data of the cloud system may further comprise temperature data of a cloud top. In this case, the component determining module may be further specifically configured to determine a density of saturated water vapor corresponding to the temperature data of the cloud top, and correct the amount of condensed cloud water according to the density of saturated water vapor.

The total amount calculating module is configured to obtain the total amount of cloud water by summing the amount of original cloud water, the amount of input cloud water, and the amount of condensed cloud water.

Figure 2:
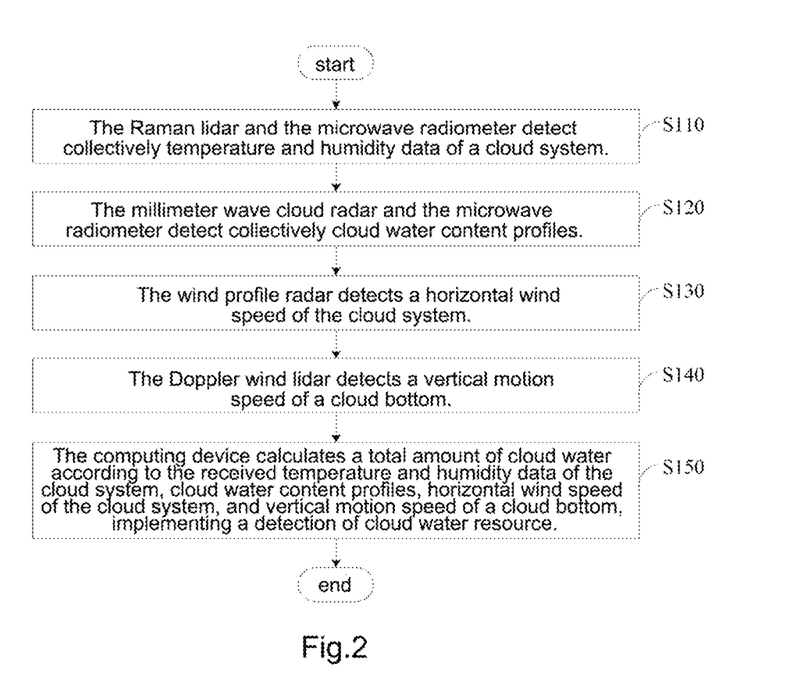
FIG. 2 is a schematic flow chart of a cloud water resource detecting method provided by the present disclosure.

Referring to FIG. 2, FIG. 2 is a schematic flow chart of a cloud water resource detecting method provided by the present disclosure. The method is applied to the cloud water resource detecting system 10. The cloud water resource detecting system 10 comprises a Raman lidar 100, a microwave radiometer 200, a millimeter wave cloud radar 300, a wind profile radar 400, a Doppler wind lidar 500, and a computing device 600, wherein the computing device 600 is in communication connection with the Raman lidar 100, the microwave radiometer 200, the millimeter wave cloud radar 300, the wind profile radar 400, and the Doppler wind lidar 500. The specific procedure of the cloud water resource detecting method is described in detail below.

Step S110. The Raman lidar 100 and the microwave radiometer 200 detect collectively temperature and humidity data of a cloud system.

Figure 3:
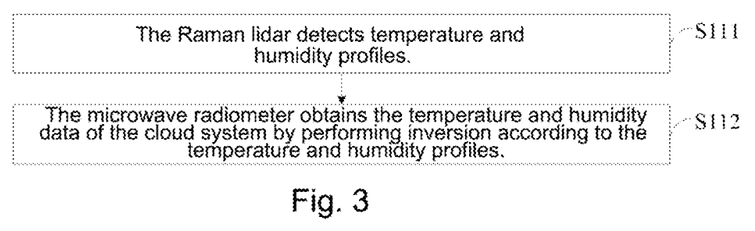
FIG. 3 is a schematic flow chart of sub-steps included in step S110 of FIG. 2.

Referring to FIG. 3, FIG. 3 is a schematic flow chart of sub-steps included in step S110 of FIG. 2. Step S110 may comprise sub-step S111 and sub-step S112. In the above, the microwave radiometer 200 is in communication connection with the Raman lidar 100.

Sub-step S111. The Raman lidar 100 detects temperature and humidity profiles.

Sub-step S112. The microwave radiometer 200 obtains the temperature and humidity data of the cloud system by performing inversion according to the temperature and humidity profiles.

Step S120. The millimeter wave cloud radar 300 and the microwave radiometer 200 detect collectively cloud water content profiles.

Step S130. The wind profile radar 400 detects a horizontal wind speed of a cloud system.

Step S140. The Doppler wind lidar 500 detects a vertical motion speed of a cloud bottom.

Step S150. The computing device 600 calculates a total amount of cloud water according to the received temperature and humidity data of the cloud system, cloud water content profiles, horizontal wind speed of a cloud system, and vertical motion speed of a cloud bottom, implementing a detection of cloud water resource.

Figure 4:
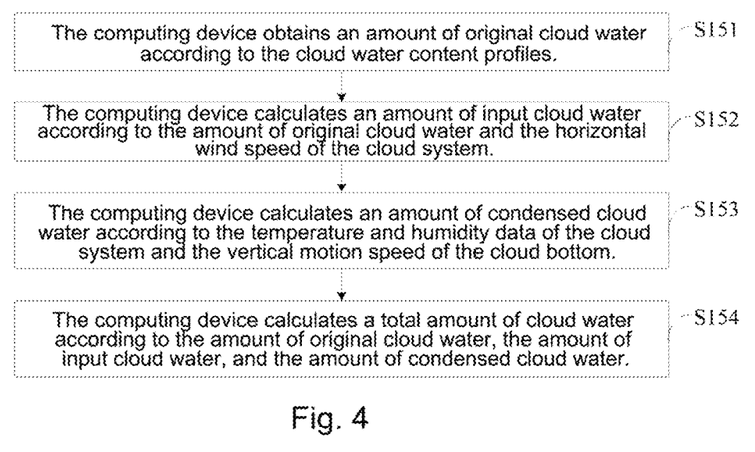
FIG. 4 is a schematic flow chart of sub-steps included in step S150 of FIG. 2.

Referring to FIG. 4, FIG. 4 is a schematic flow chart of sub-steps included in step S150 of FIG. 2. Step S150 may comprise sub-step S151, sub-step S152, sub-step S153, and sub-step S154.

Sub-step S151. The computing device 600 obtains an amount of original cloud water according to the cloud water content profiles.

In the present embodiment, the cloud water content profiles comprise cloud water content at each height, so the computing device 600 can obtain the amount of original cloud water in the cloud from the cloud water content profiles, that is, the amount of cloud water left in the previous period of time.

Sub-step S152. The computing device 600 calculates an amount of input cloud water according to the amount of original cloud water and a horizontal wind speed of a cloud system.

In the present embodiment, when the cloud layer is horizontal and uniform, its amount of laterally input cloud water and the amount of laterally output cloud water are equal for one column. In this case, the amount of input cloud water may be obtained from the detected information of the horizontal wind speed profile and the cloud water content profile at one point, wherein the horizontal wind speed profile is measured by the wind profile radar 400, and the horizontal wind speed of the cloud system may be obtained according to the horizontal wind speed profile.

Sub-step S153. The computing device 600 calculates an amount of condensed cloud water according to the temperature and humidity data of the cloud system and the vertical motion speed of the cloud bottom.

Figure 5:
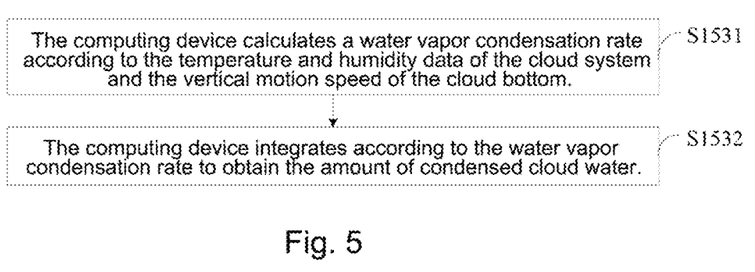
FIG. 5 is a schematic flow chart of sub-steps included in sub-step S153 of FIG. 4.

Referring to FIG. 5, FIG. 5 is a schematic flow chart of sub-steps included in sub-step S153 of FIG. 4. Sub-step S153 may comprise sub-step S1531 and sub-step S1532.

Sub-step S1531. The computing device 600 calculates a water vapor condensation rate according to the temperature and humidity data of the cloud system and the vertical motion speed of the cloud bottom.

In the present embodiment, according to the temperature data of the cloud system (for example, which may be temperature data of the cloud bottom), the amount of saturated water vapor at this temperature can be obtained, wherein the maximum amount of water vapor that can be contained by air at a certain temperature is the amount of saturated water vapor. The density of saturated water vapor is obtained from the amount of saturated water vapor and the humidity data of the cloud system (for example, which may be the humidity data of the cloud bottom), and then the water vapor condensation rate is calculated according to the density of saturated water vapor and the vertical motion speed of the cloud bottom.

Sub-step S1532. The computing device 600 integrates according to the water vapor condensation rate to obtain the amount of condensed cloud water.

Optionally, in implementation, the temperature data of the cloud top may be measured so as to determine a corresponding density of saturated water vapor, and then the error correction was performed on the amount of condensed cloud water obtained in step S1532 according to the density of saturated water vapor.

Sub-step S154. The computing device 600 calculates the total amount of cloud water according to the amount of original cloud water, the amount of input cloud water, and the amount of condensed cloud water.

In the present embodiment, the computing device 600 may calculate the total amount of cloud water according to a preset formula for a total amount of cloud water and the amount of original cloud water, the amount of input cloud water and the amount of condensed cloud water. In the above, the preset formula for a total amount of cloud water is:

$$PP = Q_h(0) + \left| \int_0^T F_h^{in} dt \right| + \int_0^T P_{cong} dt$$

wherein PP is representative of a total amount of cloud water, $Q_h(0)$ is representative of an amount of original cloud water, $F_h^{in}$ is representative of an amount of horizontally input cloud water per unit time, $P_{cong}$ is representative of a water vapor condensation rate and T is representative of a period of time for detecting.

In the related art, it is generally believed that there is more precipitation in case of more water vapor, so the precipitation potential in a certain area is usually determined according to the amount of water vapor in that area. However, this method has deficiencies, resulting in an inaccurate amount of cloud water resource measured. The specific reasons are as follows.

Figure 6:
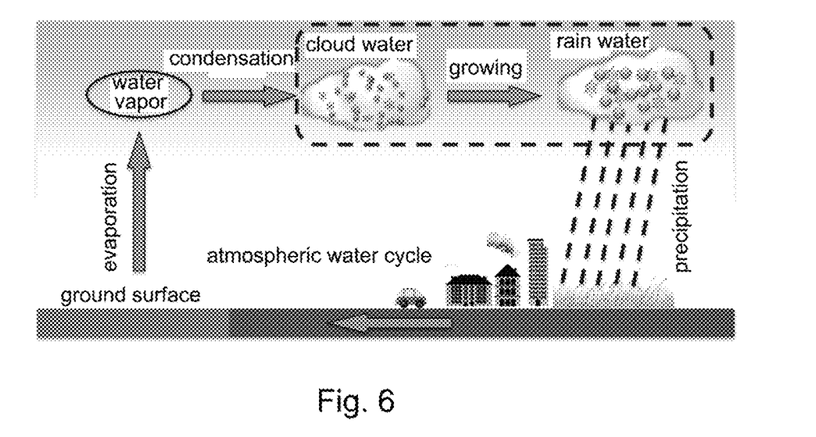
FIG. 6 is a schematic diagram of atmospheric water cycle provided by the present disclosure.

Referring to FIG. 6, FIG. 6 is a schematic diagram of atmospheric water cycle provided by the present disclosure. The atmospheric water cycle can be divided into four sub-processes: evaporation, cloud formation, rain formation and precipitation, wherein evaporation refers to a process where the liquid-state or solid-state water in the earth's surface phase-changes into water vapor to enter the atmosphere, and is the first phase change process of the atmospheric water cycle. Cloud formation refers to that the water vapor obtained by evaporation (or sublimation) moves with the air in the atmosphere (mainly air blocks and water vapor are sent to upper air by a vertical motion of air), and during the motion, air is cooled under appropriate conditions and becomes saturated, and is further cooled to reach a supersaturation, allowing water vapor condensed (or de-sublimated) to form cloud droplet, and this is the second phase change process of the atmospheric water cycle.

Condensation (or desublimation) process requires the participation of a nucleus (such as condensation nucleus (CNN) or ice nucleus (IN)), wherein the atmosphere generally does not lack condensation nucleus (may lack ice nucleus, and super-cold water droplet will be formed in the absence of ice nucleus). Therefore, as long as the air block is saturated, cloud droplet will definitely be produced by further cooling, thereby forming cloud (i.e., the above-mentioned cloud droplet). Although the formed cloud droplet can continuously grow through the condensation growth process, it is indicated from the cloud physics principle that the efficiency of condensation growth is inversely proportional to the radius of the cloud droplet. In other words, the larger the radius of the cloud droplet is, the lower its efficiency of growth will be, so the cloud droplet only increases its diameter to 8-12 microns by the condensation growth and increases almost no more thereafter.

When a diameter of the cloud droplet reaches a few hundred micrometers from a few micrometers or ten micrometers, the cloud droplet can overcome the updraft and fall to the ground to form precipitation. This process where cloud droplet of a few micrometers or ten micrometers grows to rain droplet of a hundred micrometer is a process of rain formation. When the diameter of the rain droplet reaches more than a hundred micrometer, the rain droplet falls under the action of gravity, and during the falling process, processes such as evaporation, collision, and crushing will also occur, and the water droplet which has subjected to the above process and can still reach the ground will form precipitation, and thus the atmospheric water cycle is closed.

It can be determined based on the above processes that in the process of atmospheric water cycle, phase change and energy budget are mainly involved. Under the natural atmospheric temperature and condition, water is the only substance that can present in three phases (gas-state, liquid-state, and solid-state) and that can switch (i.e., phase change) among the three phases under natural atmospheric conditions, and thus various weather phenomena are formed, which can be observed in the earth's atmosphere.

It can be seen from the above-described four sub-processes of the atmospheric water cycle that the water vapor entering the atmosphere subjected to the first phase change cannot return to the ground if there is no chance to undergo a second phase change to change back to liquid-state or solid-state water. That is, if more precipitation is needed in a certain area, there must be more water vapor, and moreover there must be an appropriate weather process that can lift such water vapor to the upper air, making it to be cloud water which likely become precipitation. In other words, a lot of water vapor without a lifting process that condenses the water vapor, the water vapor will not form precipitation. Therefore, when the precipitation potential in a certain area is detected, the detected precipitation potential will be inaccurate if we only focus on the total amount of water vapor in the atmospheric column.

The present disclosure determines the precipitation potential in a certain area by detecting the amount of condensed cloud water that has undergone a second phase change in that area, ensuring the accuracy of the detected precipitation potential. Further, the atmospheric water cycle contains a phase change process of water, which necessarily involves energy exchange. For example, evaporation needs to absorb a large amount of heat of evaporation; and condensation releases energy. Further, the air block and water vapor are lifted in case of condensation, and this lifting motion also requires a supply of energy (the energy supplied is used to overcome the potential energy). Such potential energy will be released during the precipitation process and become kinetic energy. It is unrealistic to, by the energy that human can handle, increase the amount of precipitation by evaporating a little more water vapor or lifting a little more water vapor. In case of the weather that is artificially influenced and the artificial rain enhancement, since both evaporation and cloud formation require a huge supply of energy, it is difficult to intervene in an evaporation process and a cloud formation process of the atmospheric water cycle. However, the rain formation and precipitation process do not require a significant supply of energy, which provides an opportunity for artificially influencing weather.

Based on this, in the present disclosure, the potential for artificial rain enhancement (decrement) is detected according to the principle of water amount conservation. In detail, the total amount of water for an isolated system should be conserved. If the amount of water for the system changes, there must be a source and/or an afflux. If the total amount of water for the system (including water in three phases) is Q, it should satisfy:

$$\frac{dQ}{dt} = S - D \tag{1}$$

wherein, S is a source function of the system, representing the amount of water input to the system from the surrounding per unit time; and D is a clear function of the system, representing the amount of water leaving the system per unit time.

In the atmospheric science, the system described above is often assumed as an atmospheric column, such column extends from the ground to the upper boundary of the atmosphere. Since moisture exchange is impossible at the upper boundary of the atmosphere, for this system, the source function (S) can be representative of an evaporation rate E on the ground, and the clear function (D) can be representative of a precipitation rate R on the ground. Because a geographically fixed column is discussed, the left side of the formula (1) can be expanded into a fully differential form, namely:

$$\frac{d}{dt} = \frac{\partial}{\partial t} + u\frac{\partial}{\partial x} + v\frac{\partial}{\partial y} \tag{2}$$

wherein, u and v are equivalent horizontal wind speed components.

The formula (1) in conformity with the law of moisture conservation can be written as:

$$\frac{\partial Q}{\partial t} + u\frac{\partial Q}{\partial x} + v\frac{\partial Q}{\partial y} = E - R \tag{3}$$

wherein, E is an evaporation rate (in the unit of g/s) on the ground where the column is located, and R is a precipitation rate (in the unit of g/s) on the ground where the column is located. The moisture in the column is divided into: water vapor $Q_v$ and condensed water $Q_h$, then $Q=Q_v+Q_h$. Correspondingly, the moisture conservation equation (3) can also be decomposed into equations corresponding to water vapor and condensed water:

$$\frac{\partial Q_v}{\partial t} = -F_v + E - P_{cong} + P_{evapor} \tag{4}$$

$$\frac{\partial Q_h}{\partial t} = -F_h - R + P_{cong} - P_{evapor}$$

wherein, $F_v$ is representative of water vapor in a horizontal direction per unit time, $F_h$ is representative of water condensed in a horizontal direction per unit time, $P_{cong}$ is representative of a water vapor condensation rate (unit: g/m2/s), and $P_{evapor}$ is representative of an evaporation rate of hydrate (unit: g/m2/s). Integration is performed to the formula (4) in a period of time, the following is obtained:

$$\int_0^T \frac{\partial Q_v}{\partial t} dt = -\int_0^T F_v dt + \int_0^T E dt - \int_0^T P_{cong} dt + \int_0^T P_{evapor} dt \tag{5}$$

-continued $$\int_0^T \frac{\partial Q_h}{\partial t} dt = -\int_0^T F_h dt - \int_0^T R dt + \int_0^T P_{cong} dt - \int_0^T P_{evapor} dt$$

wherein, T is a period of time for studying the precipitation of the cloud system.

As mentioned above, it is only necessary to discuss equilibrium situation of the condensed water associated with precipitation, so there is:

$$Q_h(T) - Q_h(0) = \qquad (6)$$

$$\left|\int_0^T F_h^{in} dt\right| - \left|\int_0^T F_h^{out} dt\right| - \int_0^T R dt + \int_0^T P_{cong} dt - \int_0^T P_{evapor} dt$$

wherein, the formula (6) is rewritten into:

$$Q_h(0) + \left|\int_0^T F_h^{in} dt\right| + \int_0^T P_{cong} dt = \qquad (7)$$

$$\left|\int_0^T F_h^{out} dt\right| + \int_0^T R dt + \int_0^T P_{evapor} dt + Q_h(T)$$

Figure 7:
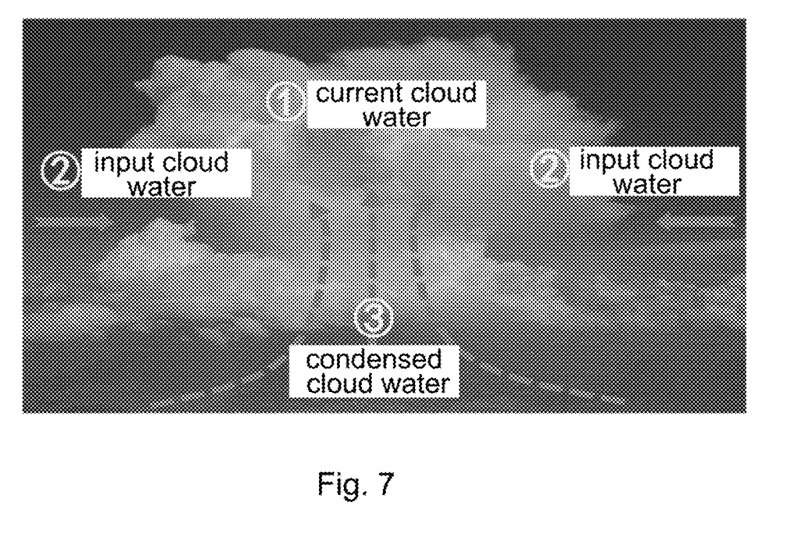
FIG. 7 is a schematic diagram of distribution and dynamic change of cloud water resource provided by the present disclosure.

Formula (7) indicates the equilibrium situation of the condensed water of the atmospheric column studied during the period of time T. In the above, the left side of the formula (7) indicates income items, which, as shown in FIG. 7, respectively, are ① the condensed water left in the previous period of time, that is, current cloud water, also called as the original cloud water; ② condensed water input from the boundary, that is, input cloud water; and ③ water condensed in the atmospheric column during the period of time T, that is, condensed cloud water. The right side of the formula (7) indicates expenditure items, which, respectively, are ① condensed water output from the boundary; ② precipitation; ③ condensed water evaporated in the column; and ④ condensed water stayed in the column. The sum of the three items on the left side of the above formula is the condensed water present in the atmospheric column studied in this period of time T, which is defined as the maximum possible amount of precipitation (PP), that is, the precipitation potential of the cloud system, i.e. a total amount of cloud water. In case that the cloud's rainmaking efficiency is very high and all the present condensed water can be converted into rainwater in time that fall on the ground, the efficiency of rain formation in this case is 1. But this is actually impossible, that is, there must be a loss with respect to the last three items on the right side of the above equation, so the precipitation efficiency of the cloud during this period of time should be:

$$\eta = \frac{\int_0^T R dt}{Q_h(0) + \left|\int_0^T F_h^{in} dt\right| + \int_0^T P_{cong} dt} = \frac{P}{PP} \qquad (8)$$

Wherein, P is representative of a total amount of precipitation, and η is representative of a precipitation efficiency in the area where the atmospheric column is located in the period of time T.

PP is determined by macro conditions of the cloud, mainly depending on the supply of water vapor and the distribution of rising airflow. In addition to specially designed dynamic catalytic operations, this value is generally not changed by operations that artificially influence the weather. η is the rain formation efficiency in rain formation process, mainly depending on the microphysical process in the cloud, that is, whether the microphysical process can effectively allow the cloud droplet to grow into rain droplet as soon as possible and thus be able to fall to the ground to form precipitation under the action of gravity. If the rain formation efficiency in the cloud is not high, the small cloud droplet will stay in the cloud space for a long time, some of them may drift to downstream areas with the airflow, some may be evaporated again, and some will always stay in the air, which reduce the amount of precipitation on the ground, and decrease the rain formation efficiency of the cloud system. The seeding operation of the artificial rain enhancement (decrement) is to change configuration of the microphysical structure in the cloud through manual intervention, so that the rain formation efficiency is improved, and the amount of precipitation in this area at this period of time is increased. The preset formula for the total amount of water is obtained from the above analysis.

As can be seen from equation (8), the calculation of the maximum possible amount of precipitation (i.e., a total amount of cloud water) over a certain period of time in a certain area requires the vertical profiles of the amount of cloud water, the horizontal wind speed, the temperature, the humidity, and the amount of condensed water in that area, wherein the vertical profile refers to a curve that shows the change of a meteorological element over a height contour.

In the above, it is very difficult to observe the vertical profile of the amount of condensed water. However, as can be seen from the simplified situation on the discussion of the adiabatic ascending of isolated air blocks in atmospheric physics, the amount of water that can be finally condensed in the air column in a period of time can be calculated with a density of saturated water vapor of a cloud bottom and a vertical motion speed of a cloud bottom. Therefore, in the present disclosure, the amount of condensed water in the maximum possible amount of precipitation can be calculated by continuously measuring the temperature of the cloud bottom and the vertical airflow speed of the cloud bottom, and then integrating the measured temperature of the cloud bottom and vertical airflow speed of the cloud bottom over time.

Optionally, when the amount of condensed water in the maximum possible amount of precipitation is calculated by integrating the temperature of the cloud bottom and vertical airflow speed of the cloud bottom over time, here is an implicit assumption that water vapor in air block of the cloud bottom will all be condensed into water, but actually the air overflown from the cloud top contains some water vapor, and thus it is not the case that all water vapor in the air block of the cloud bottom is condensed into water, and thus there may be an error. However, considering that the water vapor content in the air overflown from the cloud top is related to the density of saturated water vapor corresponding to the temperature of the cloud top, and the density of saturated water vapor is exponentially decreased as the temperature decreases. Therefore, the error caused by the above implicit assumption is very small, and can be ignored.

In practical applications, if there is a very high demand on the accuracy of detecting, the error caused by the above implicit assumption can be estimated and corrected by measuring the temperature of the cloud top.

The amount of laterally input cloud water of the column can be calculated from the data of the horizontal wind speed profile and the cloud water content profile at one point.

Figure 8:
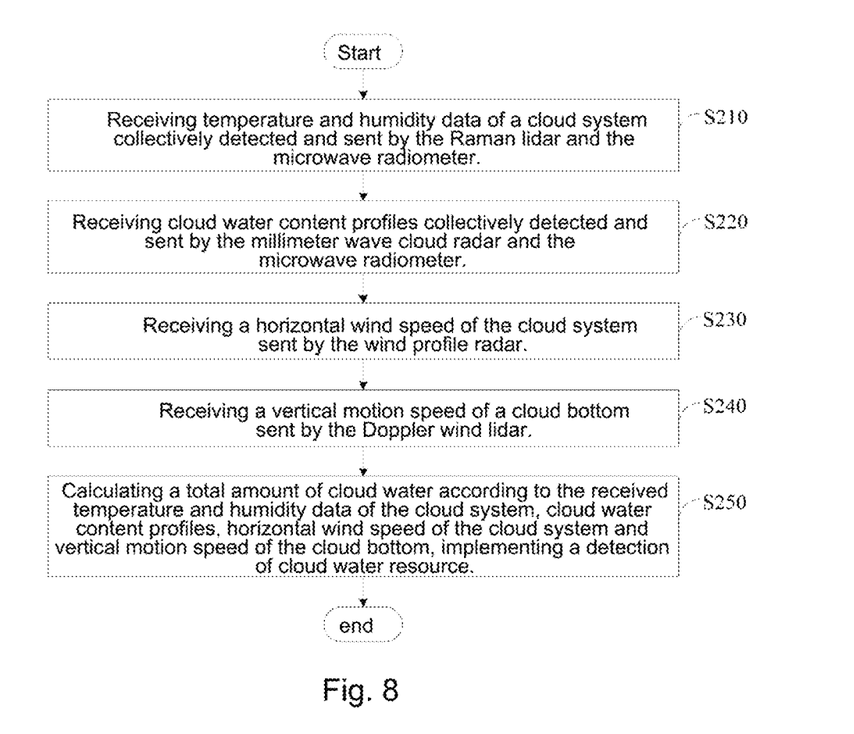
FIG. 8 is a schematic flow chart of another cloud water resource detecting method provided by the present disclosure.

Referring to FIG. 8, FIG. 8 is a schematic flow chart of another cloud water resource detecting method provided by the present disclosure. The method is applied to the computing device 600, and the computing device 600 is in communication connection with the Raman lidar 100, the microwave radiometer 200, the millimeter wave cloud radar 300, the wind profile radar 400, and the Doppler wind lidar 500. The method will be explained below.

Step S210. Receiving temperature and humidity data of the cloud system collectively detected and sent by the Raman lidar 100 and the microwave radiometer 200.

In the present embodiment, the Raman lidar 100 detects temperature and humidity profiles, and the microwave radiometer 200 in communication connection with the Raman lidar 100 obtains the temperature and humidity data of the cloud system by performing inversion according to the temperature and humidity profiles, and sends the temperature and humidity data of the cloud system to the computing device 600.

Step S220. Receiving cloud water content profiles collectively detected and sent by the millimeter wave cloud radar 300 and the microwave radiometer 200.

Step S230. Receiving a horizontal wind speed of a cloud system sent by the wind profile radar 400.

Step S240. Receiving a vertical motion speed of a cloud bottom sent by the Doppler wind lidar 500.

Step S250. Calculating a total amount of cloud water according to the received temperature and humidity data of the cloud system, cloud water content profiles, horizontal wind speed of the cloud system and vertical motion speed of the cloud bottom, implementing a detection of cloud water resource.

In the present embodiment, the step of the computing device 600 calculating a total amount of cloud water according to the received temperature and humidity data of the cloud system, cloud water content profiles, horizontal wind speed of a cloud system, and vertical motion speed of a cloud bottom, and implementing a detection of cloud water resource, comprises:

obtaining an amount of original cloud water according to the cloud water content profiles;

calculating an amount of input cloud water according to the amount of original cloud water and the horizontal wind speed of the cloud system;

calculating an amount of condensed cloud water according to the temperature and humidity data of the cloud system and the vertical motion speed of the cloud bottom; and calculating the total amount of cloud water according to the amount of original cloud water, the amount of input cloud water, and the amount of condensed cloud water.

Optionally, the step of the calculating an amount of condensed cloud water according to the temperature and humidity data of the cloud system and the vertical motion speed of the cloud bottom, comprises:

calculating a water vapor condensation rate according to the temperature and humidity data of the cloud system and the vertical motion speed of the cloud bottom; and performing integration according to the water vapor condensation rate to obtain the amount of condensed cloud water.

Optionally, the step of the calculating the total amount of cloud water according to the amount of original cloud water, the amount of input cloud water, and the amount of condensed cloud water, comprises:

calculating the total amount of cloud water according to a preset formula for a total amount of cloud water and the amount of original cloud water, the amount of input cloud water, and the amount of condensed cloud water.

In the present embodiment, for the detailed description of steps S210 to S250, reference may be made to the description of steps S110 to S150 above, and details are not repeated redundantly here.

In conclusion, the present disclosure provides a cloud water resource detecting system and method. The system comprises a Raman lidar, a microwave radiometer, a millimeter wave cloud radar, a wind profile radar, a Doppler wind lidar, and a computing device. The Raman lidar and the microwave radiometer are configured to obtain temperature and humidity data of a cloud system. The millimeter wave cloud radar and the microwave radiometer are configured to obtain cloud water content profiles. The wind profile radar is configured to obtain a horizontal wind speed of a cloud system. The Doppler wind lidar is configured to obtain a vertical motion speed of a cloud bottom. The computing device is in communication connection with the Raman lidar, the microwave radiometer, the millimeter wave cloud radar, the wind profile radar, and the Doppler wind lidar, and is configured to calculate a total amount of cloud water according to the temperature and humidity data of the cloud system, the cloud water content profiles, the horizontal wind speed of the cloud system and the vertical motion speed of the cloud bottom, implementing a detection of cloud water resource. The system not only can implement the detecting of the cloud water resource in real time, but also provide relevant data so as to analyze the distribution and dynamic change of regional cloud water resources, providing data information for artificially influencing the weather. Meanwhile, atmospheric detecting and cloud physical state detecting can also be performed to provide real-time data information for identifying the interaction mechanism between cloud and aerosol. Moreover, an effective tool is provided for studying cloud water resources.

What described above is only selected embodiments of the present disclosure, and is not intended to limit the present disclosure, and various modifications and changes may be made to the present disclosure for those skilled in the art. Any modifications, equivalent replacements, and improvements, etc. made within the spirit and principle of the present disclosure are intended to be included within the scope of protection of the present disclosure.

INDUSTRIAL APPLICABILITY

The cloud water resource detecting system and method provided by the present disclosure can combine multisource observation data, obtain a total amount of cloud water, and analyze distribution and dynamic change of regional cloud water resources, providing data resources for artificially influencing the weather, and providing an effective and accurate basis for studying the precipitation potential of the cloud system.

The invention claimed is:

1. A cloud water resource detecting system, wherein the system comprises a Raman lidar, a microwave radiometer, a millimeter wave cloud radar, a wind profile radar, a Doppler wind lidar, and a computing device, wherein the Raman lidar and the microwave radiometer are configured to obtain temperature and humidity data of a cloud system;

the millimeter wave cloud radar and the microwave radiometer are configured to obtain cloud water content profiles;

the wind profile radar is configured to obtain a horizontal wind speed of the cloud system;

the Doppler wind lidar is configured to obtain a vertical motion speed of a cloud bottom; and the computing device is in communication connection with the Raman lidar, the microwave radiometer, the millimeter wave cloud radar, the wind profile radar, and the Doppler wind lidar, and is configured to calculate a total amount of cloud water according to the temperature and humidity data of the cloud system, the cloud water content profiles, the horizontal wind speed of the cloud system and the vertical motion speed of the cloud bottom, implementing a detection of cloud water resource, wherein the computing device comprises:

a component determining module, configured to determine an amount of original cloud water according to the cloud water content profiles, determine an amount of input cloud water in a horizontal direction according to the horizontal wind speed of the cloud system and the cloud water content profiles, and calculate an amount of condensed cloud water in a vertical direction according to the temperature and humidity data and the vertical motion speed of the cloud bottom; and a total amount calculating module, configured to obtain the total amount of cloud water by summing the amount of original cloud water, the amount of input cloud water, and the amount of condensed cloud water, wherein the temperature and humidity data of the cloud system comprises temperature data of the cloud bottom and humidity data of the cloud bottom, and the component determining module is specifically configured to:

determine an amount of saturated water vapor corresponding to the temperature data of the cloud bottom, determine a density of saturated water vapor according to the amount of saturated water vapor and the humidity data of the cloud bottom, determine a water vapor condensation rate according to the density of saturated water vapor and the vertical motion speed, and integrate the water vapor condensation rate over time to obtain the amount of condensed cloud water.

2. The system according to claim 1, wherein the Raman lidar is configured to detect temperature and humidity profiles; and the microwave radiometer is in communication connection with the Raman lidar and is configured to obtain the temperature and humidity data of the cloud system by performing inversion according to the temperature and humidity profiles.

3. The system according to claim 2, wherein the microwave radiometer is further in communication connection with the millimeter wave cloud radar, and is configured to obtain, after obtaining initial cloud water content profile data, the cloud water content profiles according to the initial cloud water content profile data and the temperature and humidity data of the cloud system.

4. The system according to claim 2, wherein a propagating direction of a beam emitted by the Doppler wind lidar is perpendicular to a ground.

5. The system according to claim 1, wherein a propagating direction of a beam emitted by the Doppler wind lidar is perpendicular to a ground.

6. The system according to claim 1, wherein the temperature and humidity data of the cloud system further comprises temperature data of a cloud top, and the component determining module is further specifically configured to:

determine a density of saturated water vapor corresponding to the temperature data of the cloud top, and correct the amount of condensed cloud water according to the density of saturated water vapor.

7. A cloud water resource detecting method, being applicable to a cloud water resource detecting system, comprising a Raman lidar, a microwave radiometer, a millimeter wave cloud radar, a wind profile radar, a Doppler wind lidar, and a computing device, wherein the computing device is in communication connection with the Raman lidar, the microwave radiometer, the millimeter wave cloud radar, the wind profile radar, and the Doppler wind lidar, the method comprising:

the Raman lidar and the microwave radiometer detecting collectively temperature and humidity data of a cloud system;

the millimeter wave cloud radar and the microwave radiometer detecting collectively cloud water content profiles;

the wind profile radar detecting a horizontal wind speed of the cloud system;

the Doppler wind lidar detecting a vertical motion speed of a cloud bottom; and the computing device calculating a total amount of cloud water according to received temperature and humidity data of the cloud system, the cloud water content profiles, the horizontal wind speed of the cloud system and the vertical motion speed of the cloud bottom, implementing a detection of cloud water resource, wherein the computing device calculates the total amount of cloud water according to received temperature and humidity data of the cloud system, the cloud water content profiles, the horizontal wind speed of the cloud system, and the vertical motion speed of the cloud bottom, implementing the detection of cloud water resource, comprising:

the computing device obtaining an amount of original cloud water according to the cloud water content profiles;

the computing device calculating an amount of input cloud water according to the amount of original cloud water and the horizontal wind speed of the cloud system;

the computing device calculating an amount of condensed cloud water according to the temperature and humidity data of the cloud system and the vertical motion speed of the cloud bottom; and the computing device calculating the total amount of cloud water according to the amount of original cloud water, the amount of input cloud water, and the amount of condensed cloud water, wherein the temperature and humidity data of the cloud system comprises temperature data of the cloud bottom and humidity data of the cloud bottom; and the computing device calculates the amount of condensed cloud water according to the temperature and humidity data of the cloud system, and the vertical motion speed of the cloud bottom, comprising:

determining an amount of saturated water vapor corresponding to the temperature data of the cloud bottom, determining a density of saturated water vapor according to the amount of saturated water vapor and the humidity data of the cloud bottom, and determining a water vapor condensation rate according to the density of saturated water vapor and the vertical motion speed; and integrating the water vapor condensation rate over time to obtain the amount of condensed cloud water.

8. The method according to claim 7, wherein the microwave radiometer is in communication connection with the Raman lidar, and the Raman lidar and the microwave radiometer detect collectively the temperature and humidity data of the cloud system, comprising:

the Raman lidar detecting temperature and humidity profiles; and the microwave radiometer obtaining the temperature and humidity data of the cloud system by performing inversion according to the temperature and humidity profiles.

9. The method according to claim 8, wherein the computing device calculates the total amount of cloud water according to the amount of original cloud water, the amount of input cloud water, and the amount of condensed cloud water, the method comprising:

the computing device calculating the total amount of cloud water according to a preset formula for the total amount of cloud water, and the amount of original cloud water, the amount of input cloud water, and the amount of condensed cloud water;

wherein the preset formula for the total amount of cloud water is:

$$PP = Q_h(0) + \left| \int_0^T F_h^{in} dt \right| + \int_0^T P_{cong} dt$$

wherein PP is representative of the total amount of cloud water, $Q_h(0)$ is representative of the amount of original cloud water, $F_h^{in}$ is representative of the amount of input cloud water in a horizontal direction per unit time, $P_{cong}$ is representative of the water vapor condensation rate, and T is representative of a period of time for detection.

10. The method according to claim 7, wherein the computing device calculates the amount of condensed cloud water according to the temperature and humidity data of the cloud system and the vertical motion speed of the cloud bottom, comprising:

the computing device calculating the water vapor condensation rate according to the temperature and humidity data of the cloud system and the vertical motion speed of the cloud bottom; and the computing device performing integration according to the water vapor condensation rate to obtain the amount of condensed cloud water.

11. The method according to claim 10, wherein the temperature and humidity data of the cloud system further comprises temperature data of a cloud top; and the computing device calculates the amount of condensed cloud water according to the temperature and humidity data of the cloud system, and the vertical motion speed of the cloud bottom, the method further comprising:

determining a density of saturated water vapor corresponding to the temperature data of the cloud top, and correcting the obtained amount of condensed cloud water according to the density of saturated water vapor.

12. The method according to claim 7, wherein the temperature and humidity data of the cloud system further comprises temperature data of a cloud top; and the computing device calculates the amount of condensed cloud water according to the temperature and humidity data of the cloud system, and the vertical motion speed of the cloud bottom, the method further comprising:

determining a density of saturated water vapor corresponding to the temperature data of the cloud top, and correcting the obtained amount of condensed cloud water according to the density of saturated water vapor.

13. The method according to claim 7, wherein the computing device calculates the total amount of cloud water according to the amount of original cloud water, the amount of input cloud water, and the amount of condensed cloud water, the method comprising:

the computing device calculating the total amount of cloud water according to a preset formula for the total amount of cloud water, and the amount of original cloud water, the amount of input cloud water, and the amount of condensed cloud water;

wherein the preset formula for the total amount of cloud water is:

$$PP = Q_h(0) + \left| \int_0^T F_h^{in} dt \right| + \int_0^T P_{cong} dt$$

wherein PP is representative of the total amount of cloud water, $Q_h(0)$ is representative of the amount of original cloud water, $F_h^{in}$ is representative of the amount of input cloud water in a horizontal direction per unit time, $P_{cong}$ is representative of the water vapor condensation rate, and T is representative of a period of time for detection.

14. A cloud water resource detecting method, being applicable to a computing device, wherein the computing device is in communication connection with a Raman lidar, a microwave radiometer, a millimeter wave cloud radar, a wind profile radar, and a Doppler wind lidar, the method comprising:

receiving temperature and humidity data of a cloud system collectively detected and sent by the Raman lidar and the microwave radiometer;

receiving cloud water content profiles collectively detected and sent by the millimeter wave cloud radar and the microwave radiometer;

receiving a horizontal wind speed of the cloud system sent by the wind profile radar;

receiving a vertical motion speed of a cloud bottom sent by the Doppler wind lidar; and calculating a total amount of cloud water according to received temperature and humidity data of the cloud system, the cloud water content profiles, the horizontal wind speed of the cloud system and the vertical motion speed of the cloud bottom, implementing a detection of cloud water resource, wherein step of calculating a total amount of cloud water according to received temperature and humidity data of the cloud system, the cloud water content profiles, the horizontal wind speed of the cloud system and the vertical motion speed of the cloud bottom comprises obtaining an amount of original cloud water according to the cloud water content profiles, calculating an amount of input cloud water according to the amount of original cloud water and the horizontal wind speed of the cloud system, calculating an amount of condensed cloud water according to the temperature and humidity data of the cloud system and the vertical motion speed of the cloud bottom, and calculating the total amount of cloud water according to the amount of original cloud water, the amount of input cloud water, and the amount of condensed cloud water, wherein the temperature and humidity data of the cloud system comprises temperature data of the cloud bottom and humidity data of the cloud bottom; and step of calculating an amount of condensed cloud water according to the temperature and humidity data of the cloud system and the vertical motion speed of the cloud bottom comprises determining an amount of saturated water vapor corresponding to the temperature data of the cloud bottom, determining a density of saturated water vapor according to the amount of saturated water vapor and the humidity data of the cloud bottom, determining a water vapor condensation rate according to the density of saturated water vapor and the vertical motion speed, and integrating the water vapor condensation rate over time to obtain the amount of condensed cloud water.

* * * * *